(12) United States Patent
Kawamura et al.

(10) Patent No.: US 11,624,408 B2
(45) Date of Patent: Apr. 11, 2023

(54) SHAFT COUPLING

(71) Applicant: JTEKT CORPORATION, Osaka (JP)

(72) Inventors: Naofumi Kawamura, Kishiwada (JP); Hideyuki Honkado, Shiki-gun (JP)

(73) Assignee: JTEKT CORPORATION, Osaka (JP)

( * ) Notice: Subject to any disclaimer, the term of this patent is extended or adjusted under 35 U.S.C. 154(b) by 142 days.

(21) Appl. No.: 17/168,685

(22) Filed: Feb. 5, 2021

(65) Prior Publication Data

US 2021/0262529 A1 Aug. 26, 2021

(30) Foreign Application Priority Data

Feb. 20, 2020 (JP) .............................. JP2020-027538

(51) Int. Cl.
*F16D 3/68* (2006.01)
*B62D 5/04* (2006.01)

(52) U.S. Cl.
CPC .............. *F16D 3/68* (2013.01); *B62D 5/0403* (2013.01); *B62D 5/0454* (2013.01)

(58) Field of Classification Search
CPC ........ F16D 3/68; B62D 5/0403; B62D 5/0454
USPC ..................................................... 464/73, 75
See application file for complete search history.

(56) References Cited

U.S. PATENT DOCUMENTS

| | | | | |
|---|---|---|---|---|
| 3,879,959 A | * | 4/1975 | Clampett | F16D 3/78 464/73 |
| 7,699,709 B2 | * | 4/2010 | Kubota | F16D 3/68 464/73 |

FOREIGN PATENT DOCUMENTS

| | | |
|---|---|---|
| EP | 1416180 A1 | 5/2004 |
| EP | 1752671 A1 | 2/2007 |
| EP | 1830090 A1 | 9/2007 |
| JP | 2013-144490 A | 7/2013 |
| JP | 2015-031346 A | 2/2015 |
| JP | 2015-215052 A | 12/2015 |
| WO | 2007/063780 A1 | 6/2007 |
| WO | 2018/216233 A1 | 11/2018 |

OTHER PUBLICATIONS

Jul. 21, 2021 Search Report issued in European Patent Application No. 21157632.7.

* cited by examiner

*Primary Examiner* — Greg Binda
(74) *Attorney, Agent, or Firm* — Oliff PLC

(57) ABSTRACT

A shaft coupling includes a first coupling member, a second coupling member, and a cushioning member. The first coupling member includes first protrusions. The second coupling member includes second protrusions. The cushioning member includes a plurality of radiating portions. When the first coupling member and the second coupling member are arranged coaxially and the first coupling member and the second coupling member are in an unloaded state, predetermined paired facing surfaces have a minimum clearance angle present on a radially outer side with respect to a center of the radiating portion in a radiating direction. The predetermined paired facing surfaces are at least one of first paired facing surfaces and second paired facing surfaces.

3 Claims, 4 Drawing Sheets

SHAFT COUPLING

CROSS-REFERENCE TO RELATED APPLICATION

This application claims priority to Japanese Patent Application No. 2020-027538 filed on Feb. 20, 2020, incorporated herein by reference in its entirety.

BACKGROUND

1. Technical Field

The present disclosure relates to a shaft coupling that couples a first shaft to which a torque is input and a second shaft configured to output the torque.

2. Description of Related Art

An output shaft of an electric motor and an input shaft of a speed reducer are connected in an axial direction via a shaft coupling to transmit a torque about an axis. A shaft coupling described in Japanese Unexamined Patent Application Publication No. 2015-215052 (JP 2015-215052 A) connects an output shaft of an electric motor and a worm shaft of a worm reducer. A cushioning member is provided between the output shaft and the worm shaft to smooth out displacement of the shafts.

SUMMARY

Some worm reducers employ a mechanism in which the worm shaft is tilted and pressed against a worm wheel to reduce a backlash. In this worm reducer, a torque may be transmitted in an angular offset state in which an axis of the worm shaft that is an input shaft does not agree with an axis of a second shaft configured to output the torque.

Even though the torque is transmitted in the angular offset state, the cushioning member provided in the shaft coupling is expected to smooth out the angular offset. However, the inventors have found that abnormal noise is generated from the output-side electric motor. As a result of extensive research and experiment, the inventors have found that, when the torque is transmitted in the angular offset state, a balance of a radial load applied to the cushioning member is lost, and a part of the radial load remains without being canceled out, thereby causing the abnormal noise.

According to the present disclosure, it is possible to reduce abnormal noise from a connected electric motor.

An aspect of the present disclosure relates to a shaft coupling. The shaft coupling couples a first shaft to which a torque is input and a second shaft configured to output the torque. The shaft coupling includes a first coupling member fixed to an end of the first shaft on a side of the second shaft, a second coupling member fixed to an end of the second shaft on a side of the first shaft, and a cushioning member including a plurality of radiating portions extending radially. The first coupling member includes a plurality of first protrusions provided at predetermined intervals in a circumferential direction of the first shaft. The first protrusions protrude toward the second shaft. The second coupling member includes a plurality of second protrusions provided at predetermined intervals in a circumferential direction of the second shaft to protrude between the first protrusions. Each of the radiating portions is disposed between the first protrusion and the second protrusion. When the first coupling member and the second coupling member are disposed coaxially and the first coupling member and the second coupling member are in an unloaded state, predetermined paired facing surfaces have a minimum clearance angle present on a radially outer side with respect to a center of the radiating portion in a radiating direction. The predetermined paired facing surfaces are at least one of first paired facing surfaces and second paired facing surfaces. The first paired facing surfaces are facing surfaces of the first protrusion and the radiating portion. The second paired facing surfaces are facing surfaces of the second protrusion and the radiating portion. The clearance angle is an angle of two intersections of an imaginary concentric circle and the predetermined paired facing surfaces about a connection axis. The imaginary concentric circle is defined about the connection axis on which the first coupling member and the second coupling member are disposed.

According to the structure described above, it is possible to reduce the abnormal noise generated from the electric motor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure is described below in detail with reference to the drawings. The embodiment described below demonstrates a comprehensive or specific example of the present disclosure. Numerical values, shapes, materials, constituent elements, arrangements and connection forms of the constituent elements, steps, the order of the steps, and the like described in the following embodiment are examples, and are not intended to limit the present disclosure. Among the constituent elements of the following embodiment, constituent elements that are not described in independent claims that demonstrate the broadest concept are described as optional constituent elements.

The drawings are schematic drawings in which objects are emphasized, omitted, or adjusted in terms of their proportions as appropriate to demonstrate the present disclosure. Therefore, shapes, positional relationships, and proportions may differ from actual shapes, positional relationships, and proportions.

Figure 1:
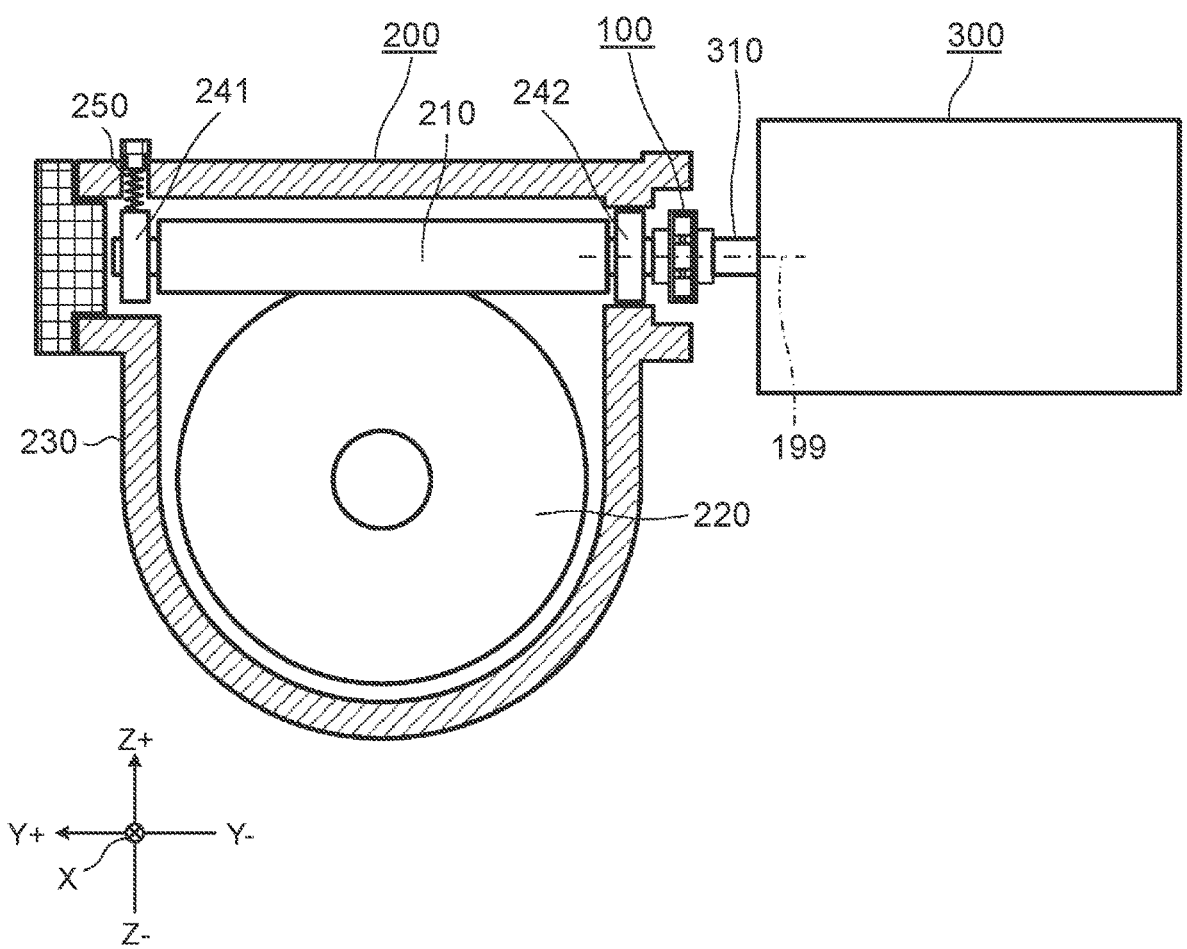
FIG. 1 is a diagram illustrating a shaft coupling according to an embodiment of the present disclosure, a speed reducer coupled to the shaft coupling, and an electric motor.

FIG. 1 is a diagram illustrating a shaft coupling 100 according to the embodiment of the present disclosure, a speed reducer 200 coupled to the shaft coupling 100, and an electric motor 300. As illustrated in FIG. 1, the speed reducer 200 includes a worm shaft 210, a worm wheel 220, a housing 230, a first bearing 241, a second bearing 242, and an urging member 250. The worm shaft 210 functions as a first shaft to which a torque is input.

The housing 230 is a structural member that houses the worm shaft 210 and the worm wheel 220.

The worm shaft 210 is rotatably retained on the housing 230 by the first bearing 241 and the second bearing 242. The worm shaft 210 is retained to be tiltable about the second bearing 242, and is pressed toward the worm wheel 220 via the first bearing 241 by an urging force of the urging member 250.

The worm wheel 220 is rotatably retained on the housing 230, and outputs rotation of the worm shaft 210 while reducing the speed of the rotation. For example, the worm wheel 220 is coupled to a steering shaft of a steering system, and increases a torque of the electric motor 300 that is input to the worm shaft 210, thereby applying an assist torque to the steering shaft.

Inside the housing 230, the first bearing 241 retains an end of the worm shaft 210 opposite to an input side. The first bearing 241 is retained to be reciprocable in a direction toward the worm wheel 220 (Z-direction in FIG. 1) relative to the housing 230. Therefore, the worm shaft 210 can be tilted about the second bearing 242 that retains the other end of the worm shaft 210.

The electric motor 300 is not particularly limited as long as the electric motor 300 is an actuator including an output shaft 310 that functions as a second shaft configured to output a rotational torque when electric power is supplied. Examples of the electric motor 300 include a three-phase brushless motor.

Figure 2:
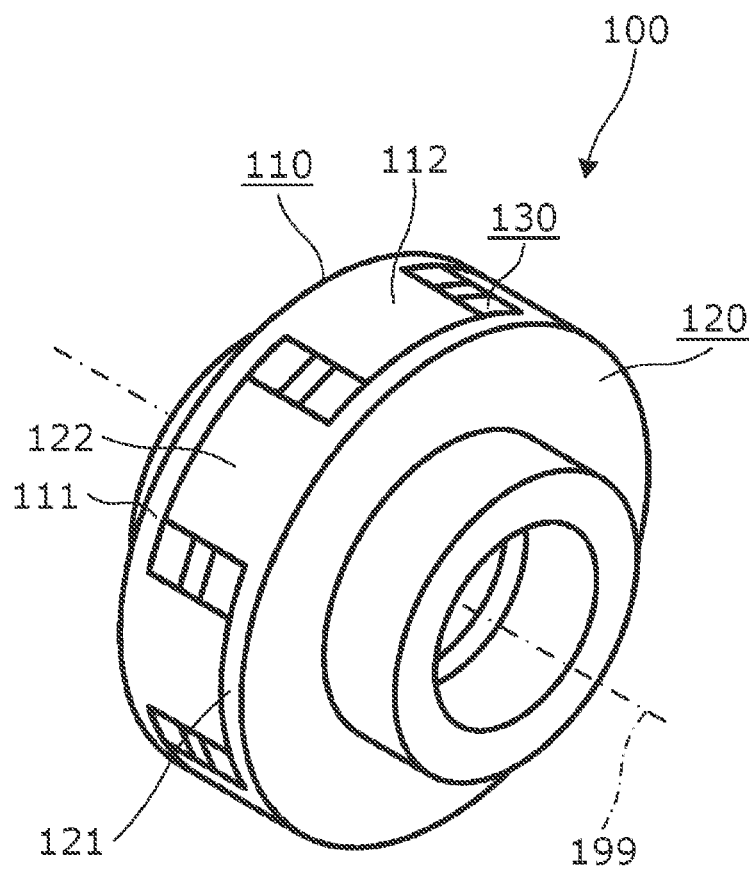
FIG. 2 is a perspective view illustrating the shaft coupling.
Figure 3:
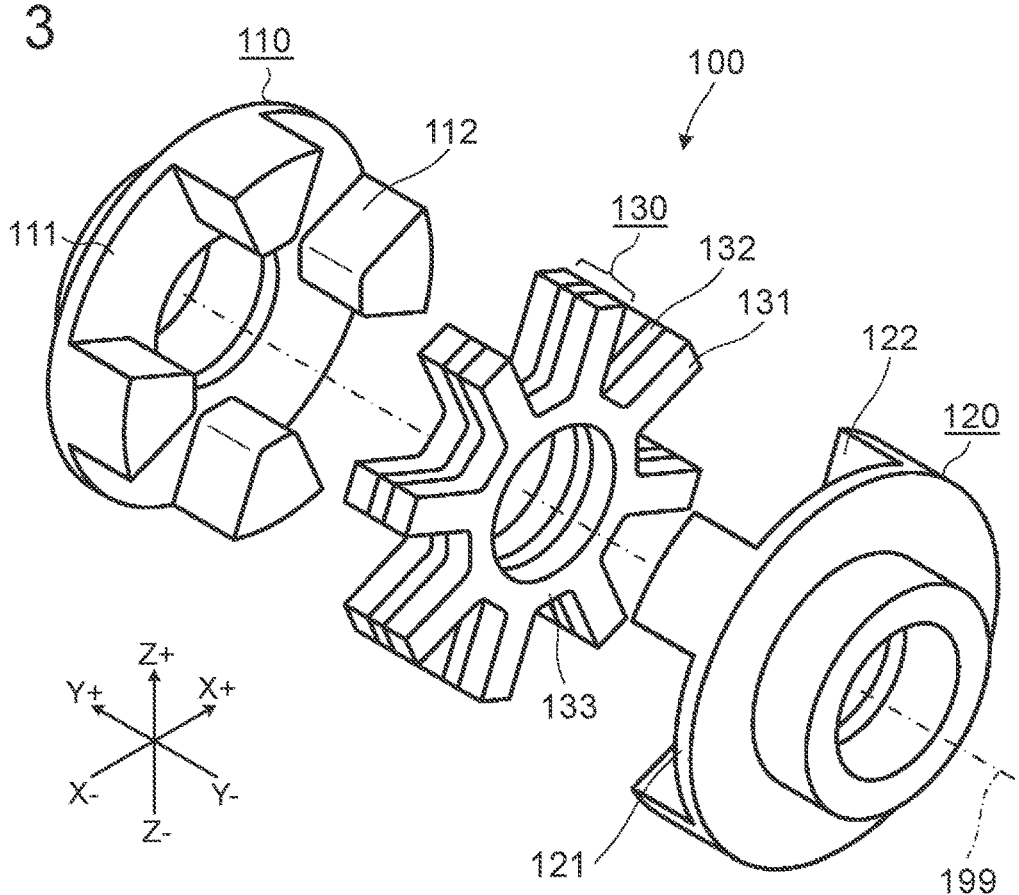
FIG. 3 is an exploded perspective view illustrating the shaft coupling.

FIG. 2 is a perspective view illustrating the shaft coupling 100. FIG. 3 is an exploded perspective view illustrating the shaft coupling 100. As illustrated in FIG. 2 and FIG. 3, the shaft coupling 100 couples the worm shaft 210 that functions as the first shaft to which a torque is input and the output shaft 310 that functions as the second shaft configured to output the torque. The shaft coupling 100 includes a first coupling member 110, a second coupling member 120, and a cushioning member 130.

The first coupling member 110 includes a first flange 111 and a plurality of first protrusions 112. The first flange 111 has a circular plate shape, and is fixed to the end of the worm shaft 210 close to the output shaft 310. The first protrusions 112 are provided at predetermined intervals in a circumferential direction, and protrude toward the second coupling member 120.

In this embodiment, the first flange 111 and the first protrusions 112 are integrally formed from a metal, and the end of the worm shaft 210 is fixed while being inserted into the first flange 111 by press fitting. Each of the first protrusions 112 has a columnar shape along a connection axis 199, and the sectional shape of each of the first protrusion 112 in a plane perpendicular to the connection axis 199 is uniform in a direction along the connection axis 199. The number of first protrusions 112 is not limited as long as a plurality of first protrusions 112 is provided. In this embodiment, the first coupling member 110 includes four first protrusions 112 equiangularly.

The second coupling member 120 includes a second flange 121 and a plurality of second protrusions 122. The second flange 121 has a circular plate shape, and is fixed to an end of the output shaft 310 close to the worm shaft 210. The second protrusions 122 are provided at predetermined intervals in a circumferential direction of the second flange 121 to protrude between the first protrusions 112.

In this embodiment, the second flange 121 and the second protrusions 122 are integrally formed from a metal, and the end of the output shaft 310 is fixed while being inserted into the second flange 121 by press fitting. Each of the second protrusions 122 has a columnar shape along the connection axis 199, and the sectional shape of each of the second protrusions 122 in a plane perpendicular to the connection axis 199 is uniform in the direction along the connection axis 199. The number of second protrusions 122 is not limited as long as a plurality of second protrusions 122 is provided. In this embodiment, the second coupling member 120 includes four second protrusions 122 equiangularly. The shape of the second protrusion 122 is identical to the shape of the first protrusion 112. The overall shape of the first coupling member 110 is identical to the overall shape of the second coupling member 120.

The cushioning member 130 mitigates a shock when the shaft coupling 100 transmits a torque. The cushioning member 130 includes radiating portions 131 and a hub 133. Although the material for the cushioning member 130 is not particularly limited, this embodiment employs a resin having a hardness enough to resist significant crushing when the shaft coupling 100 transmits a torque, and configured to absorb a shock at the moment the torque to be transmitted is applied or when the direction of the torque changes.

The radiating portions 131 extend radially around the connection axis 199, and are arranged between the first protrusions 112 and the second protrusions 122. In this embodiment, the four first protrusions 112 and the four second protrusions 122 are arranged to mesh with each other. Therefore, the radiating portions 131 are integrally connected to the hub 133 at eight positions equiangularly.

Figure 4:
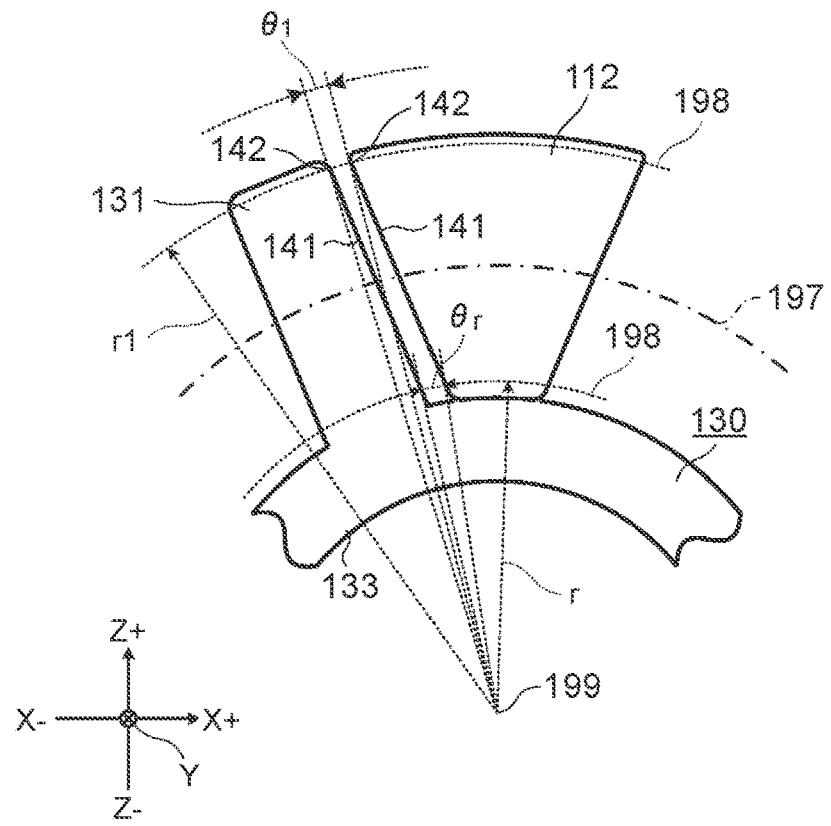
FIG. 4 is a plan illustrating a relationship between a radiating portion and a first protrusion while emphasizing their clearance.

FIG. 4 is a plan illustrating a relationship between the radiating portion 131 and the first protrusion 112 while emphasizing their clearance. As illustrated in FIG. 4, when the first coupling member 110 and the second coupling member 120 are arranged on the same connection axis 199 and are in an unloaded state, first paired facing surfaces 141 that are facing surfaces of the first protrusion 112 and the radiating portion 131 have a minimum clearance angle $\theta 1$ present on a radially outer side with respect to a center 197 of the radiating portion 131, provided that a clearance angle $\theta$ is an angle of two intersections 142 of each imaginary concentric circle 198 and the first paired facing surfaces 141 about the connection axis 199. The imaginary concentric circles 198 are defined about the connection axis 199. A relationship of $\theta 1 \leq \theta r$ is obtained (Or is a function of the clearance angle $\theta$ that depends on a radius r of the imaginary concentric circle 198; minimum radius of radiating portion 131<r<maximum radius of radiating portion 131).

When the shaft coupling 100 transmits a torque, a heavy load applied to the radiating portion 131 can be spotted on the radially outer side with respect to the center 197 of the radiating portion 131. Therefore, it is possible to reduce a load that remains without being canceled out when a balance of a radial load is lost due to an angular offset between the worm shaft 210 and the output shaft 310. Thus, it is possible to reduce abnormal noise from the electric motor 300 by reducing a strain on the electric motor 300.

In this embodiment, the position of the intersection 142 where the minimum clearance angle $\theta 1$ is obtained is a radially outermost portion of the radiating portion 131 (except a chamfer). That is, when the shaft coupling 100 transmits a torque, a heavy load is first generated at the radially outermost portion of the radiating portion 131. When a radiating axis is defined as an imaginary axis extending in a radiating direction about the connection axis 199, the facing surface of the radiating portion 131 is located in a plane that is parallel to and spaced by a predetermined distance away from a plane including the radiating axis and the connection axis 199. The facing surface of the first protrusion 112 is not parallel to the plane including the radiating axis and the connection axis 199, but is inclined gradually away from this plane with increasing distance from a radially outer side to a radially inner side. With the first paired facing surfaces 141 having such relationship, the position of the intersection 142 where the minimum clearance angle θ1 is obtained is the radially outermost portion.

Although FIG. 4 illustrates a relationship between the first protrusion 112 and the radiating portion 131 located on a counterclockwise side of the first protrusion 112, the first protrusion 112 and the radiating portion 131 located on a clockwise side of the first protrusion 112 may have a similar relationship. Further, second paired facing surfaces that are facing surfaces of the second protrusion 122 and the radiating portion 131 may have a similar relationship.

In this embodiment, the shaft coupling 100 includes a maintaining member 132 configured to maintain, in the unloaded state, a predetermined clearance as at least one of a clearance between the first protrusion 112 and the radiating portion 131 and a clearance between the second protrusion 122 and the radiating portion 131. The maintaining member 132 is made of a material softer than a material for at least the radiating portion 131 of the cushioning member 130. Examples of the material for the maintaining member 132 include a rubber and a porous resin. When the shaft coupling 100 transmits a torque, the maintaining member 132 is crushed while hardly resisting the torque, and the cushioning member 130 transmits the torque. In the unloaded state in which the torque is not transmitted, the maintaining member 132 restores its shape by restorability of the maintaining member 132, and adjusts at least one of the clearance between the first protrusion 112 and the radiating portion 131 and the clearance between the second protrusion 122 and the radiating portion 131 to the predetermined clearance.

Figure 5:
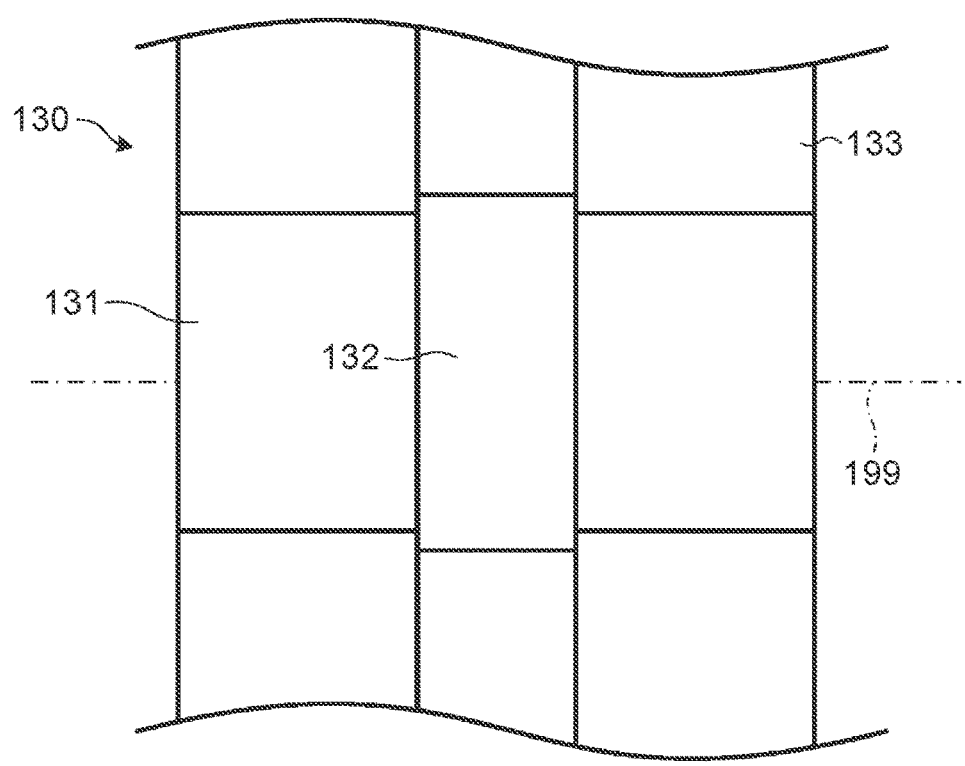
FIG. 5 is a plan illustrating a cushioning member and a maintaining member viewed toward a center in a radiating direction.

The arrangement of the maintaining member 132 is not particularly limited. For example, the maintaining member 132 may be attached to one of the first paired facing surfaces 141. In this embodiment, the maintaining member 132 is arranged between two layers in the cushioning member 130, which are divided in the direction along the connection axis 199. The shape of the maintaining member 132 in a plane perpendicular to the connection axis 199 is substantially identical to the shape of the cushioning member 130. As illustrated in FIG. 5, however, the width of the maintaining member 132 at a part corresponding to the radiating portion 131 (length in a circumferential direction about the connection axis 199) is larger than the width of the radiating portion 131. The maintaining member 132 is attached to the cushioning member 130 to protrude to both sides in the circumferential direction relative to the radiating portion 131. In this embodiment, all the radiating portions 131 and the parts of the maintaining member 132 corresponding to the radiating portions 131 have the same arrangement relationship.

In the shaft coupling 100 that connects the worm shaft 210 of the speed reducer 200 and the output shaft 310 of the electric motor 300 according to the embodiment described above, when a torque is input from the electric motor 300, at least one of the first protrusion and the second protrusion presses the radiating portion 131 of the cushioning member 130. The at least one of the first protrusion and the second protrusion applies a heavy load on the radially outer side with respect to the center of the radiating portion 131. Therefore, imbalance in the load applied to the entire radiating portion 131 decreases. Thus, the strain transmitted to the electric motor 300 is reduced, and the possibility of abnormal noise from the electric motor 300 is reduced.

The present disclosure is not limited to the embodiment described above. For example, the embodiment of the present disclosure may be any other embodiment attained by arbitrarily combining the constituent elements described herein or excluding some of the constituent elements. The present disclosure encompasses modified examples attained by variously modifying the embodiment described above by persons skilled in the art without departing from the spirit of the present disclosure, that is, meanings of words described in the claims.

Figure 6:
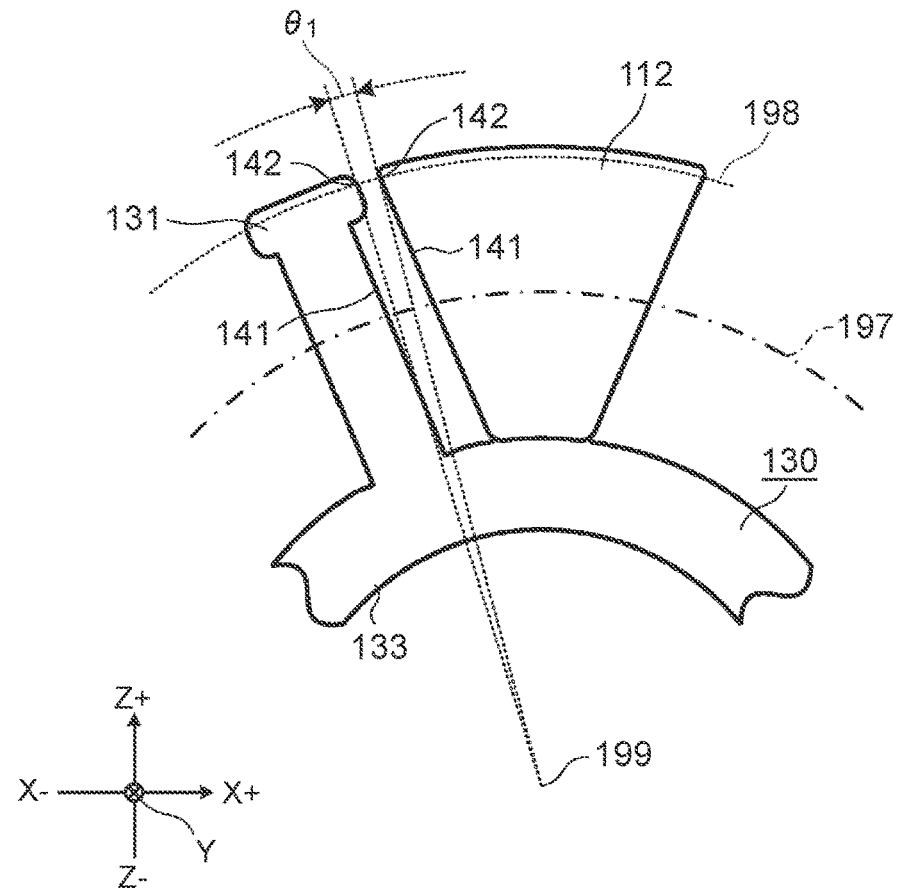
FIG. 6 is a plan illustrating another example of the cushioning member.

For example, as illustrated in FIG. 6, the radiating portion 131 may have a part protruding toward at least one of the first protrusion 112 and the second protrusion 122 on the radially outer side with respect to the center 197 of the radiating portion 131.

The embodiment described above is directed to the case where the width of the radiating portion 131 (length in the circumferential direction) is constant in the radial direction, and the width of at least one of the first protrusion 112 and the second protrusion 122 increases toward the radially outer side. The width of at least one of the first protrusion 112 and the second protrusion (length in the circumferential direction) may be constant in the radial direction, and the width of the radiating portion 131 may increase toward the radially outer side. Further, the width of at least one of the first protrusion 112 and the second protrusion 122 may increase toward the radially outer side, and the width of the radiating portion 131 may increase toward the radially outer side.

The present disclosure is available for connection of an electric motor and a worm reducer including an anti-backlash system, and connection of two shafts that transmit a torque and may have an angular offset.

What is claimed is:

1. A shaft coupling that couples a first shaft to which a torque is input and a second shaft configured to output the torque, the shaft coupling comprising:
a first coupling member fixed to an end of the first shaft on a side of the second shaft, the first coupling member including a plurality of first protrusions provided at predetermined intervals in a circumferential direction of the first shaft, the first protrusions protruding toward the second shaft;
a second coupling member fixed to an end of the second shaft on the side of the first shaft, the second coupling member including a plurality of second protrusions provided at predetermined intervals in a circumferential direction of the second shaft to protrude between the first protrusions; and
a cushioning member including a plurality of radiating portions extending radially, each of the radiating portions being disposed between the first protrusion and the second protrusion, wherein
when the first coupling member and the second coupling member are disposed coaxially and the first coupling member and the second coupling member are in an unloaded state, predetermined paired facing surfaces have a minimum clearance angle present on a radially outer side with respect to a center of the radiating portion in a radiating direction, the predetermined paired facing surfaces being at least one of first paired facing surfaces and second paired facing surfaces,
the first paired facing surfaces are facing surfaces of the first protrusion and the radiating portion, the second paired facing surfaces are facing surfaces of the second protrusion and the radiating portion, the clearance angle is an angle of two intersections of an imaginary concentric circle and the predetermined paired facing surfaces about a connection axis, the imaginary concentric circle being defined about the connection axis on which the first coupling member and the second coupling member are disposed, the facing surface of the radiating portion in the predetermined paired facing surfaces is located in a first plane that is (i) extending in a direction parallel to a second plane defined by the radiating direction and the connection axis and (ii) spaced from the second plane, and the facing surface of the first protrusion or of the second protrusion in the predetermined paired facing surfaces is not parallel to the second plane and is inclined, relative to the second plane, such that a distance between the predetermined paired facing surfaces decreases from a radially inner side toward the radially outer side in the radiating direction so as to have the minimum clearance angle present on the radially outer side.

2. The shaft coupling according to claim 1, further comprising a maintaining member softer than the cushioning member, the maintaining member being configured to maintain, in the unloaded state, a predetermined clearance as at least one of a clearance between each of the first protrusions and each of the radiating portions and a clearance between each of the second protrusions and each of the radiating portions.

3. The shaft coupling according to claim 2, wherein each of the radiating portions is divided into a plurality of layers in a direction along the connection axis, and the maintaining member is disposed between the layers of each of the radiating portions.

* * * * *